(12) United States Patent
Romesburg (10) Patent No.: US 6,507,653 B1
(45) Date of Patent: Jan. 14, 2003

(54) DESIRED VOICE DETECTION IN ECHO SUPPRESSION

(75) Inventor: Eric Douglas Romesburg, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/549,964

(22) Filed: Apr. 14, 2000

(51) Int. Cl.$^7$ ................................................ H04M 9/08
(52) U.S. Cl. ............................ 379/406.05; 379/406.01; 379/406.06; 379/406.07; 379/406.08; 379/406.09; 379/406.1; 379/406.11; 379/406.14; 379/406.03; 379/406.04
(58) Field of Search ...................... 379/406.01–406.16

(56) References Cited

U.S. PATENT DOCUMENTS

| | | | |
|---|---|---|---|
| 4,811,404 A | | 3/1989 | Vilmur et al. |
| 5,475,731 A | * | 12/1995 | Rasmusson |
| 5,835,851 A | * | 11/1998 | Rasmusson |
| 5,920,834 A | * | 7/1999 | Sih et al. |
| 6,185,300 B1 | * | 2/2001 | Romesburg |

FOREIGN PATENT DOCUMENTS

| | | |
|---|---|---|
| EP | 0739123 A2 | 10/1996 |
| GB | 2245459 A | 1/1992 |
| WO | WO98/33311 | 7/1998 |

OTHER PUBLICATIONS

Master's Thesis "Implementation and Evaluation of Echo Cancellation Algorithms" by Sundar G. Sankaran, Bradley Department of Electrical Emgineering, Virginia Polytechnic Institute and State University, Dec. 1996, 120 pages.
Article from Ericsson Review No. 2, "Mobile Crosstalk Control—Enhancing Speech Quality in Digital Cellular Networks" by Anders Eriksson, Maria Eriksson, Tonu Trump and Teresa Vallon Hulth, published 1998, pp. 65–67 and 83–90.
Article "Trends in Mobile Communications: Ericsson Echo Cancellers—A Key To Improved Speech Quality" by Anders Eriksson, Gunnar Eriksson, Johnny Karlsen, Anders Roxstrom and Teresa Vallon Hulth, published by Ericsson, 1996, 12 pages.

* cited by examiner

*Primary Examiner*—Forester W. Isen
*Assistant Examiner*—Ramnandan Singh
(74) *Attorney, Agent, or Firm*—Coats & Bennett, P.L.L.C.

(57) ABSTRACT

A hybrid echo suppresser and associated methods of use provide echo suppression in a bi-directional communications system, while minimizing desired-voice signal disruption. The hybrid echo suppresser includes a linear echo canceller (LEC), a non-linear processor (NLP), and a control circuit. The LEC operates on an echo-causing signal to produce an estimated-echo signal, which is subtracted from an input echo-containing signal, thereby producing an echo-cancelled signal. The NLP operates on this echo-cancelled signal to eliminate residual echo arising from system non-linearities. The control circuit repeatedly compares the echo-containing signal and the estimated-echo signal to determine if the echo-containing signal includes a desired-voice component. If not, the control circuit operates the NLP in an echo-voice mode having substantial signal attenuation. Upon detecting the start or continuation of the desired-voice component, the control circuit switches the NLP such that it has less attenuation and avoids clipping or suppressing the desired voice.

32 Claims, 6 Drawing Sheets

DESIRED VOICE DETECTION IN ECHO SUPPRESSION

BACKGROUND OF THE INVENTION

This application is a Continuation-In-Part of Applicant's co-pending U.S. application Ser. No. 09/005,144, entitled "Methods and Apparatus for Controlling Echo Suppression in Communications Systems," filed on Jan. 9, 1998, and incorporated herein by reference.

The present invention relates to echo suppression in bi-directional communications systems and, in particular, relates to minimizing clipping and distortion of desired-voice signals while providing satisfactory echo suppression.

In bi-directional communications, two or more systems transfer information, one system to the other. Thus, each system both receives and transmits information. In the context of voice conversation, remote parties engage in two-way conversation, with each party both sending and receiving signals representative of speech. Ideally, signals received by a party on the near-end contain only the speech (and noise) originated by the far-end party. Echo phenomena represent deviations from this ideal case and, with regard to voice transmissions, refer to one party undesirably receiving a delayed version of his or her own voice during the conversation.

In a more generalized sense, echo refers to a transmitted signal undesirably being reflected back—typically with a variable delay—in a received signal. In the context of voice communications, echo refers to one party receiving a delayed version of his or her own voice. Such echo may arise from network echo and/or acoustic echo. Impedance mismatches within the transmission network carrying the two-way signals can result in network echo. As an example, impedance mismatches in 4-to-2 wire hybrid interface s in central offices of the Public Switched Telephone Network may cause network echo. Acoustic coupling between an output loudspeaker and an associated input microphone is referred to as acoustic echo. Speakerphones, in-car phone systems, and other examples of "hands-free" communication systems are primary examples of instances where acoustic echo may be problematic. In either instance, transmission delay within the communications system exacerbates the problem of echo. With increasing delay, the echo signal becomes increasingly displaced in time from the actual signal and, therefore, more noticeable. Satellite-based telephony is an example of a communications system having significant intrinsic delay, with round-trip signal delays of approximately of 520 milliseconds. Other types of communications systems have less obvious sources of delay. For example, wireless mobile communications systems employing digital encoding techniques, such as Global Services for Mobile systems (GSM) or TIA/EIA-136, have signal encoding delays on the order of 100 milliseconds. G.131, published by the International Telecommunication Union—Telecommunication Standardization Section (ITU-T), recommends the use of echo control devices in communications systems having delays above 25 milliseconds. Consequently, network echo control measures are commonplace.

Echo control, absent proper design and use, can itself contribute to degraded communications quality. Echo cancellation represents a common echo control technique wherein a linear echo canceller (LEC) produces an estimated-echo signal based on processing an echo-causing signal. In other words, the linear echo canceller models the influence an echo-causing signal has on an echo-containing signal. By subtracting this estimated-echo signal from the echo-containing signal, the resultant echo-cancelled signal is ideally stripped of its echo component. System non-linearities, however, result in a residual echo component not cancelled by the linear estimated-echo signal. For example, pulse-based digital encoding algorithms introduce signal non-linearities. Loudspeaker audio distortion, resulting in differences between the echo-causing loudspeaker drive signal and the actual echo signal input to a microphone, represents an example of audio-based non-linearity.

One interesting prior-art approach to desired voice detection in the context of LEC control is disclosed in a master's thesis written by S. G. Sankaran entitled, "Implementation and Evaluation of Echo Cancellation Algorithms," published in December 1996 by Virginia Polytechnic Institute, Blacksburg, Va. This thesis describes a so-called "Itakura distance measure" used to determine the presence of desired speech based on processing an echo-containing signal in conjunction with an echo-causing signal (pp. 40–45). However, this approach is problematic because the actual echo component in the echo-containing signal experiences spectral shaping due to the echo path and, thus, differs from the echo-causing signal. Plus, the echo-causing signal does not reflect the time shifting associated with the echo path. The Sankaran thesis also discloses a "Double-Talk Detection Statistic" (DTDS) algorithm used to enable/disable adaptation of a linear echo canceller (pp. 46–48). This DTDS algorithm uses the echo-cancelled signal, an estimated-echo signal, and the echo-causing signal in determining whether to enable/disable adaptation of the linear echo canceller. However, the DTDS algorithm can be problematic as it does not consider background noise in the echo-cancelled signal in its calculations. The DTDS algorithm can also provide false detection of desired voice, like other prior-art systems, based on mistakenly identifying an increase in echo-cancelled signal energy arising from abrupt changes in the echo path as desired voice.

In general, because of residual echo problems resulting from system non-linearities or abrupt deviations in echo coupling, prior-art systems often combine a LEC with a non-linear processor (NLP) to form a "hybrid" echo suppresser. These hybrid echo suppressers pass the echo-cancelled signal through the NLP to further attenuate the echo-cancelled signal, including its residual-echo component. NLP-based echo suppression uses a non-linear process to block echo voice and pass desired voice. This operation usually involves operating the NLP in a pass-through mode or in a blocking mode, depending on detected conditions. When both users (the near- and far-end parties) talk simultaneously—referred to as "double talk"—existing NLPs sometimes operate in the blocking mode, which severely distorts or cuts out the desired voice. Existing hybrid echo suppressers often undesirably switch into pass-through mode when the echo-causing signal (e.g., loudspeaker output) has a step change in noise, such as when the echo path or background noise changes abruptly. This undesirable tendency to switch into pass-through mode often subjects the far-end party to undesirable echo. Because a NLP thus configured operates on the entire echo-cancelled signal, its operation must be carefully controlled or desired-voice signals (non-echo voice) may be undesirably clipped or attenuated.

As explained, muting operations of the NLP interfere with desired-voice signals if the NLP fails to quickly transition from its blocking mode to its pass-through mode. Prior-art hybrid echo suppressers process the echo-cancelled signal in conjunction with the estimated-echo signal to determine the start or continuation of the desired-voice signal to effect NLP mode control. Because updates in the estimated-echo signal lag current echo-path characteristics, sudden changes in the actual echo path and fast noise bursts result in a momentarily poor estimate of current echo. Thus, these prior-art approaches are subject to incorrectly setting the NLP mode based on changes in the echo-cancelled signal arising not from desired-voice, but rather arising from echo-path changes, noise bursts, and other transients influences that change echo components in the echo-containing signal faster than may be adapted to by the LEC.

SUMMARY OF THE INVENTION

The present invention includes methods and apparatus for minimizing echo in a bi-directional communications system. While elimination of echo is unquestionably desirable, how echo is controlled significantly influences the quality of transmitted speech. For example, conventional NLP-based echo suppressers may operate obtrusively and undesirably clip or suppress desired speech signals.

The improved hybrid echo suppresser of the present invention includes a LEC that helps in subtracting estimated echo from an echo-containing signal and a NLP for removing residual echo from the resultant echo-cancelled signal. A logic circuit controls operation of the NLP such that it provides required levels of echo suppression while avoiding the disruption of desired speech signals based on quickly detecting the start of desired voice. The logic circuit repeatedly compares the echo-containing signal with the estimated-echo signal, which is derived from an echo-causing signal. In this manner, the logic circuit reliably transitions the NLP from its echo-voice (blocking) mode to its desired-voice (pass-through) mode upon detecting the start of desired voice. Moreover, the logic circuit reliably maintains the NLP in its pass-through mode based on continuing detection of desired voice in the echo-containing signal. Thus, the hybrid echo suppresser of the present invention avoids letting the echo through even in the presence of echo-path changes and avoids disrupting the desired-voice signal during periods of double-talk.

In an exemplary embodiment, an energy-based comparison allows the logic circuit to determine whether the echo-containing signal includes a desired-voice component. If not, the NLP operates in an echo-voice mode with significant signal attenuation, thereby ensuring sufficient echo-suppression. However, upon start-of-desired voice detection, the logic circuit switches from echo-voice mode to a desired-voice mode, which has significantly less signal attenuation, thereby avoiding significant clipping or disruption of the desired voice. Thereafter, continued detection of desired voice ensures that the logic circuit does not inadvertently switch back to echo-voice mode, such as during periods of double-talk. Thus, during periods of double-talk (when there is both echo voice and desired voice), the logic circuit maintains the NLP in desired-voice mode.

The improved hybrid echo suppresser of the present invention provides performance advantages in comparison to prior-art hybrid echo suppressers. Reliable detection of desired voice allows the improved hybrid echo suppresser of the present invention to appropriately control its NLP in providing effective echo suppression, while avoiding distortion or clipping of desired voice.

DETAILED DESCRIPTION OF THE INVENTION

Figure 1:
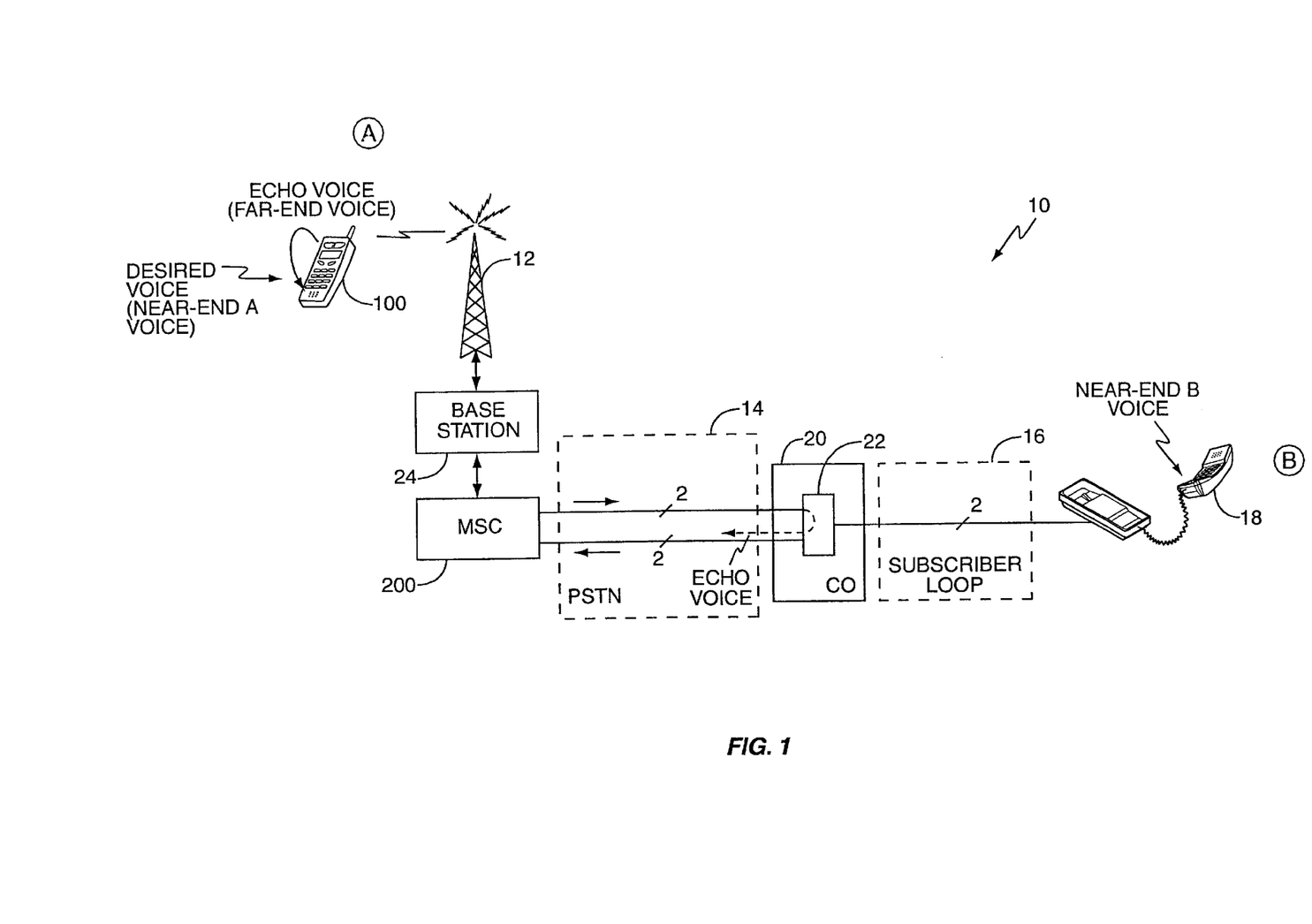
FIG. 1 illustrates an exemplary communications system in which hybrid echo suppresser of the present invention may be advantageously used.

FIG. 1 illustrates an exemplary bi-directional communications system 10 in which the hybrid echo suppresser of the present invention may be advantageously used. Viewed as a composite, the communications system 10 includes a mobile terminal 100 in wireless communications with a Mobile Switching Center 200 (MSC) via communications tower 12 and associated base station 24. MSC 200 interfaces to Central Office (CO) 20 via Public Switched Telephone Network (PSTN) 14. Voice input into the mobile terminal 100 at near-end A is encoded by the mobile terminal and transmitted to the MSC 200 via tower 12 and associated base station 24, where it is further processed and then transmitted to Central Office 20 through PSTN 14. Central Office 20 transmits these signals to a conventional telephone handset 18 via a two-wire subscriber loop 16. The telephone handset 18 outputs a facsimile of the mobile terminal user's voice based on these received signals. Conversely, voice input from a telephone handset user is converted into transmit signals that are conveyed from the telephone handset 18 at near-end B to the Central Office 20 via subscriber loop 16. The signals are then conveyed to MSC 200 via PSTN 14, where they are encoded for transmission to mobile terminal 100 via tower 12. Mobile terminal 100 receives and decodes these transmitted signals. After decoding, these received signals are used by the mobile terminal 100 to drive included loudspeaker 168, thereby generating a facsimile of the telephone handset user's voice.

The foregoing process introduces two primary sources of echo. First, voice signals from the telephone handset user, as reproduced by the loudspeaker included in mobile terminal 100 undesirably couple back into the microphone input of mobile terminal 100. Thus, the telephone handset user receives signals representative of the mobile terminal user's voice as well as an echo signal representative of their own transmitted voice. Because of round-trip transit delay in the communications system 10, the echo signal may be significantly displaced in time from their actual voice signal. As newer mobile terminals 100 become increasingly smaller, physical separation of the included loudspeaker and microphone is diminished, thereby increasing acoustic coupling problems. In an exemplary embodiment, mobile terminal 100 includes the improved hybrid echo suppresser 140 of the present invention to minimize acoustic echo returned to the far-end telephone handset user.

A second cause of signal echo can result from impedance mismatches between a 4-to-2 wire hybrid circuit 22 and the 2-wire subscriber loop 16. Thus, network echo results from interfacing the four-wire transmission network (PSTN 14) with the two-wire subscriber loop 16. Telephone handset 18 both transmits and receives signals using the two-wire subscriber loop 16. Within Central Office 20, the hybrid circuit 22 separates these combined transmit and receive signals for interface with the separate transmit and receive circuits comprising the transmission network 14. Because of imperfect impedance matching, a portion of transmit signal energy transmitted on the two-wire transmit pair of transmission network 14 undesirably reflects back to MSC 200 on the two-wire receive pair of transmission network 14. Thus, signals received through transmission network of PSTN 14 by MSC 200 include not only signals from the telephone handset 18, but also include signals transmitted by MSC 200. Consequently, the mobile terminal user receives signals representative of the telephone handset user's voice, as well as an echo signal representative of their own transmitted voice. Because of encoding and transmission delays, this received echo voice may be significantly displaced in time from their actual voice signal. In a second exemplary embodiment, the MSC 200 includes the improved hybrid echo suppresser 140 of the present invention to minimize network echo returned to the mobile terminal user.

Note that while FIG. 1 depicts a communications system 10 in which a mobile terminal 100 communicates with a telephone handset 18, such illustration is for benefit of understanding the discussion herein and should not in any way be construed as limiting the application of the present invention. Echo suppression, as practiced in accordance with exemplary embodiments of the present invention, may involve both network and acoustic echo cancellation in or between various kinds or types of communication applications. Examples of such applications include mobile terminal-to-mobile terminal communications, speakerphone communications, and various other voice or data systems. Thus, various embodiments of the improved hybrid echo suppresser 140 of the present invention may be advantageously used to control echo in a broad range of voice and data communication applications.

Figure 2A:
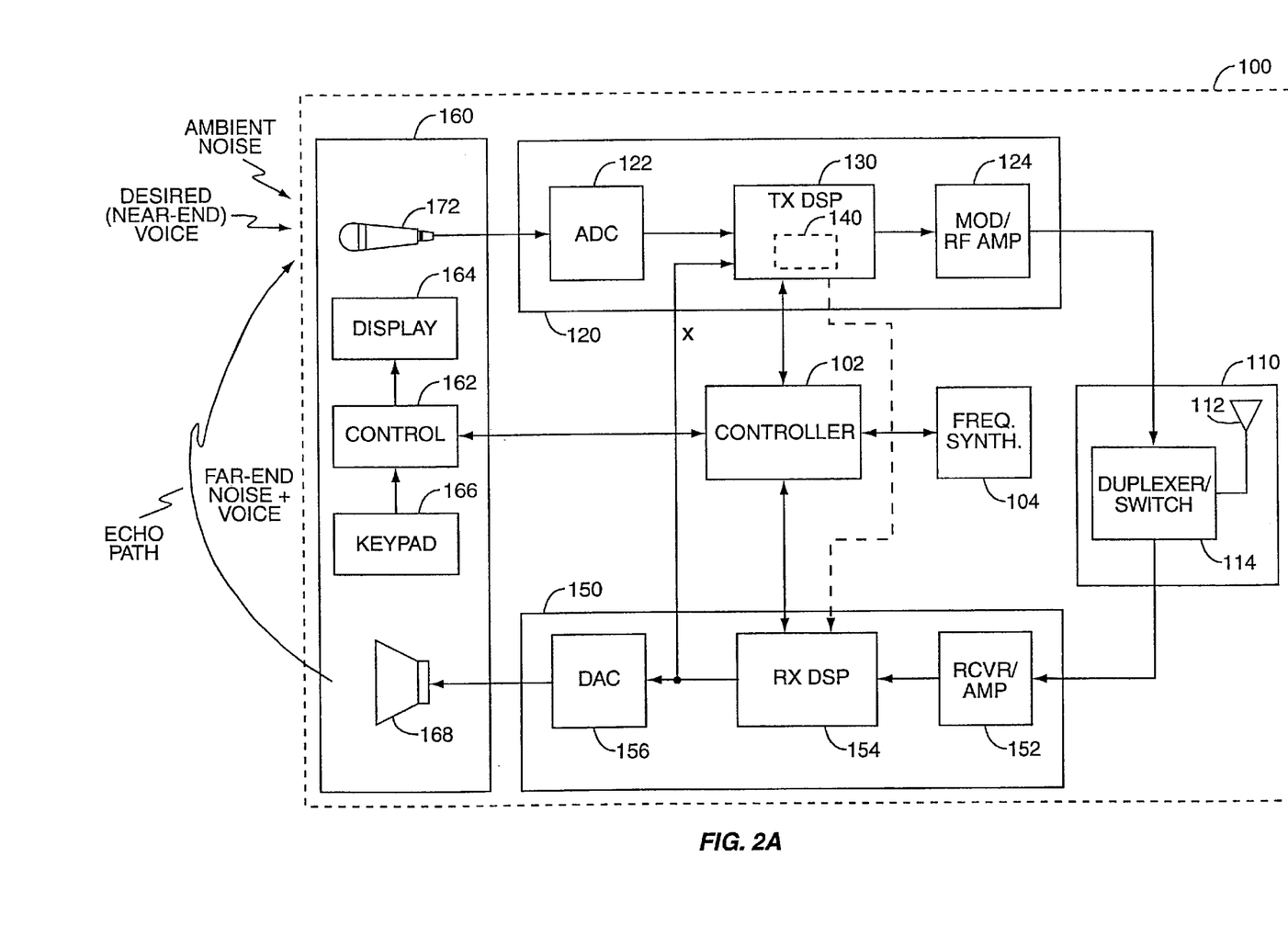
FIG. 2A is an exemplary block diagram for the mobile terminal of FIG. 1.

FIG. 2A provides details regarding an exemplary embodiment for the mobile terminal 100 of FIG. 1. A functional overview of mobile terminal design and operation facilitates understanding the present invention as applied to acoustic echo cancellation in mobile terminal 100. The mobile terminal 100 includes an operator interface 160, a controller 102, a frequency synthesizer 104, a transmitter 120, a receiver 150, and an antenna assembly 110, including a duplexer 114 and antenna 112 for receiving and transmitting signals. Note that while FIG. 2A depicts an exemplary mobile terminal 100, design and implementation details not associated with the hybrid echo suppresser 140 of the present invention are not critical to practicing the present invention.

The operator interface 160 typically includes a display 164, a keypad 166, a microphone 172, a loudspeaker 168, and an interface controller 162. The display 164 allows an operator to dial digits, monitor call status, and view other service information. The keypad 166 allows the operator to dial numbers, enter commands, and select various options. The interface controller 162 interfaces the display 164 and keypad 166 with the controller 102. The microphone 172 receives acoustic signals from the user (e.g., speech) and other sources (e.g., background noise, etc.) and converts them to analog, electrical signals. A loudspeaker 168 converts analog electrical signals from the receiver 150 to acoustic signals that can be heard by the user.

Analog electrical signals from the microphone 172 are supplied to the transmitter 120. The transmitter 120 includes an analog to digital converter (ADC) 122, a signal processor (DSP) 130, and a modulator/RF amplifier 124. The ADC 122 converts analog electrical signals from the microphone 172 into corresponding digital signals, which are transferred to the transmitter DSP 130. In cooperation with the controller 102, the DSP 130 processes the digital signals received from the ADC 122 for transmission by modulator/RF amplifier 124.

Modulator/RF amplifier 124 transmits at a carrier frequency derived from an output of frequency synthesizer 104, with the specific carrier frequency based on current uplink channel assignments. The DSP 130 typically includes a speech coder and channel coder (not shown) for processing the digitized speech signals to prepare them for transmission. The speech coder compresses the digital signal and the channel coder inserts error detection, error correction, and signaling information in accordance with requirements of the particular mobile communications system 10 in which the mobile terminal 100 is used. The modulator/RF amplifier 124 converts the output from the DSP 130 into a signal suitable for transmission by the antenna assembly 110. In an exemplary embodiment, the transmitter DSP 130 functionally incorporates the hybrid echo suppresser 140 of the present invention, as will be more fully detailed herein. Thus, transmitter DSP 130 operates on the digitized microphone input signal to remove echo from the digitized microphone input signal caused by the audio output from loudspeaker 168.

The receiver 150 includes a receiver/amplifier 152, a receiver DSP 154, and a digital-to-analog converter (DAC) 156. Signals received through the antenna assembly 110 are passed to the receiver/amplifier 152, which shifts the frequency spectrum of the received RF signals and amplifies them to a level appropriate for subsequent processing by the receiver DSP 154. Frequency synthesizer 104 typically provides receiver/amplifier 152 an injection signal having a frequency related to current downlink channel assignments for downconverting the received RF signals. DSP 154 usually includes an equalizer to compensate for phase and amplitude distortions in the channel-corrupted signal, a demodulator for extracting bit sequences from the received signal, and a detector for determining transmitted bits based on the extracted sequences (not shown). A channel decoder checks for channel errors in the received signal. The channel decoder includes logic for separating control and signaling data from speech data (not shown). Control and signaling data passes to the controller 102 while speech data passes to a speech decoder (not shown) for processing. Processed speech data then passes to the DAC 156 for conversion to an analog speech signal. The analog speech signal drives the loudspeaker 168 to produce an audible output, e.g., voice. In an exemplary embodiment, transmitter DSP 130 also receives the processed speech data for use in the hybrid echo suppresser.

The controller 102 coordinates the operation of the transmitter 120 and the receiver 150, and may, for instance, take the form of a typical microprocessor. This microprocessor may be a dedicated or shared microprocessor, a single processor or multiple, parallel processors, as needed or desired. Coordination of the receiver 150 and transmitter 120 includes coordinating power control, channel selection, and timing, as well as a host of other functions known in the art. The controller 102 inserts signaling messages into the transmitted signals and extracts signaling messages from the received signals. The controller 102 responds to any base station commands contained in the extracted signaling messages, including uplink and downlink channel reassignments, and implements user commands. When the user enters commands via the keypad 166, interface controller 162 transfers them to the controller 102 for action.

Figure 2B:
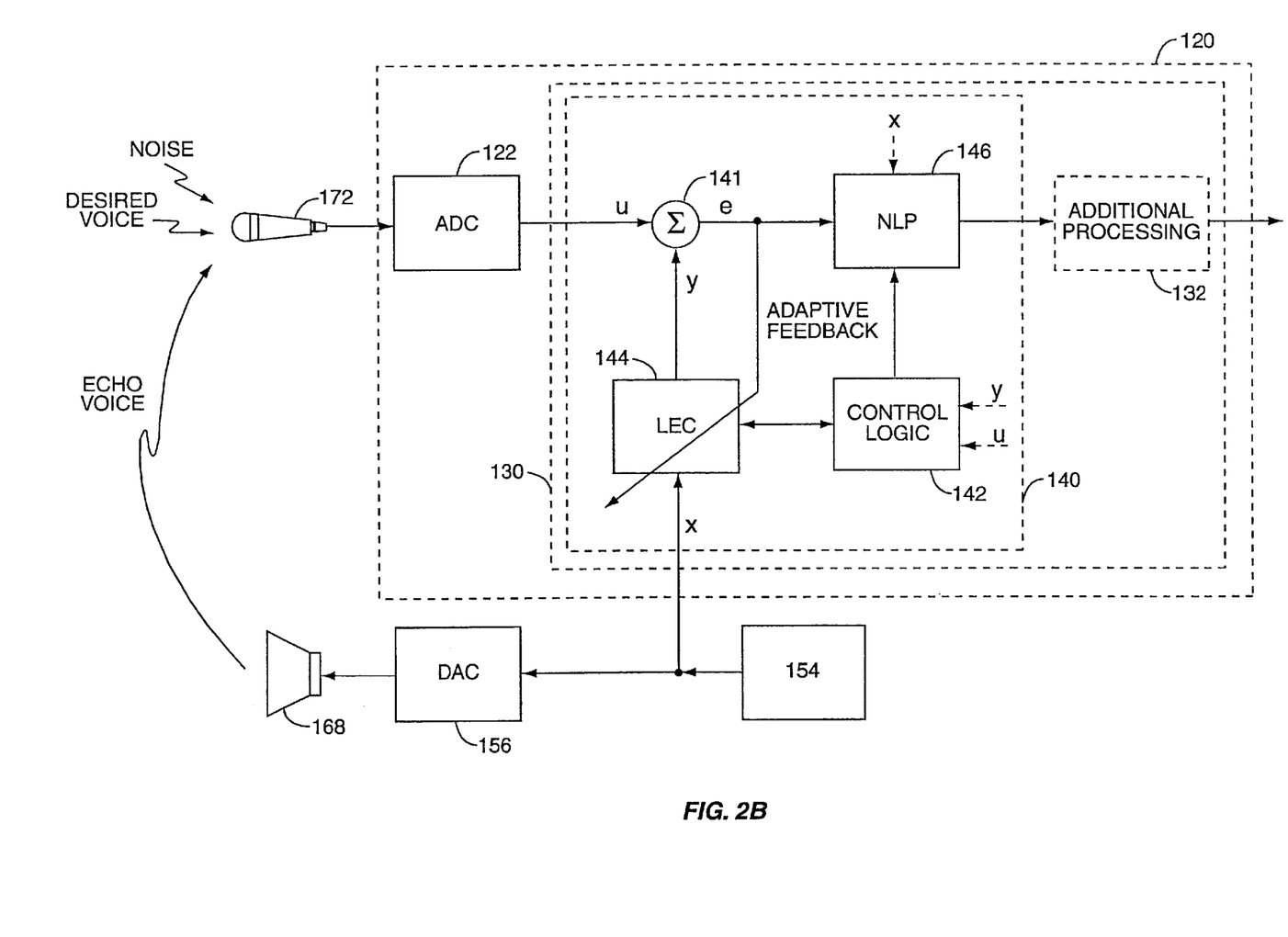
FIG. 2B shows one embodiment of the hybrid echo suppresser of FIG. 2A.

In the context of FIG. 2B, acoustic echo suppression amounts to eliminating signal components in the microphone signal arising from sounds emitted by loudspeaker 168. Microphone 172 produces an analog electrical output signal responsive to input sounds. These input sounds include local ambient noise, desired voice (e.g., mobile terminal user speech), and, undesirably, a portion of the output sound from loudspeaker 168. These loudspeaker output sounds include both noise and speech from the far-end telephone handset 18. Thus, the digitized microphone output signal u contains background noise, desired voice, echo noise, and echo voice. The signal u is referred to as an echo-containing signal. Of course, the actual components of signal u vary depending upon whether the mobile terminal and telephone handset users are alternately or simultaneously speaking.

Because output sounds from loudspeaker 168 are a function of the processed speech signals output from receiver DSP 154, an estimated-echo signal y may be derived from the processed speech signal x. Because of its causal role in the acoustic echo problem, the processed speech signal x is termed the echo-causing signal. By subtracting the estimated-echo signal y from the echo-containing signal u using summing circuit 141, a substantial portion of the echo components in echo-containing signal u may be removed. A LEC 144 provides the estimated-echo y based on digitally filtering the echo-causing signal x. An echo-canceled signal e results from the subtraction of the estimated-echo signal y from the echo-containing signal u. The echo-canceled signal e includes a residual echo component due, in part, to signal non-linearities associated with loudspeaker 168. That is, output from the loudspeaker 168 is not a perfect analog reproduction of the echo-causing signal x.

An exemplary least mean squares based LEC is described in U.S. Pat. No. 5,475,731 to Rasmusson et al., the disclosure of which is incorporated herein by reference. An advanced, normalized least mean squares-based LEC is described in co-pending application Ser. No. 08/852,729, entitled, "An Improved Echo Canceller for Use In Communications Systems," filed May 7th, 1997, and commonly assigned with Applicant's present application, the disclosure of which is also incorporated herein by reference.

In terms of acoustic echo path, overall characteristics of the actual echo signal or component in the echo-containing signal u depend upon the acoustic path between loudspeaker 168 and microphone 172. Essentially, the echo-causing signal x is subjected to a transfer function dependent upon DAC 156, loudspeaker 168, microphone 172, ADC 122, and, most importantly, the acoustic path between loudspeaker 168 and microphone 172. This last element is perhaps most critical because it varies in time. By shifting positions, the mobile terminal user constantly changes the acoustic echo path. LEC 144 uses adaptive feedback techniques to update its internal filter coefficients based on characteristics of the echo-canceled signal e relating to residual echo.

Such adaptive feedback allows the LEC 144 to continually adjust its output estimated-echo signal y, however such adjustments lag when echo path conditions are changing rapidly. Advanced methods for dynamically measuring the echo cancellation provided by a LEC are described in the co-pending application Ser. No. 09/005,149, entitled "Methods and Apparatus for Improved Echo Suppression in Communications Systems," and filed Jan. 9, 1998, the disclosure of which is incorporated herein by reference.

System non-linearities and echo-cancellation adjustment delays, as discussed above, dictate additional measures to ensure adequate echo suppression. The hybrid echo suppresser 140 includes a NLP 146 that operates on the echo-canceled signal e to provide suppression of residual echo. Operation of NLP 146 is controlled by control logic 142. In an exemplary embodiment, NLP 146 operates in a desired-voice mode when the echo-containing signal u includes a desired-voice component. In its desired-voice mode of operation, NLP 146 does not appreciably attenuate the echo-canceled signal e, thereby ensuring undisrupted transmission of the mobile terminal user's speech. Absent desired voice, NLP 146 preferably operates in an echo-voice mode wherein NLP 146 provides substantial attenuation for echo-canceled signal e, such that the far-end telephone handset user is not subjected to echo voice problems.

Applicant's commonly assigned and co-pending application Ser. No. 09/005,144, previously incorporated herein by reference, describes how to configure an exemplary NLP 146 for desired-voice and echo-voice operation. It should be noted that application Ser. No. 09/005,144 uses the terms "near-end voice" and "far-end voice" to describe the more generalized terms "desired voice" and "echo voice" used herein. In the context of acoustic echo suppression discussed herein, the terms "echo-containing signal " and "echo-causing signal" correspond to the terms "microphone signal" and "far-end audio signal" used in application Ser. No. 09/005,144.

NLP-based echo suppressers are typically scaling or windowing types whose operation is based on signal amplitude. An exemplary scaling type echo suppresser is described in U.S. Pat. No. 5,283,784 to Genter, the disclosure of which is incorporated herein by reference. An alternative clipping-type echo suppresser, known in the art as an AC-center clipper, is described in a co-pending application, Ser. No. 08/775,797, entitled "An AC-Center Clipper for Noise and Echo Suppression in a Communications System," filed Dec. 31, 1996, the disclosure of which is incorporated herein by reference. An advanced hybrid suppresser, referred to herein as an AC-center attenuator, is described in the co-pending application Ser. No. 09/005,149, previously incorporated herein by reference.

More specifically, exemplary prior-art echo suppressers detect desired voice by determining the voice energy contained in the echo-canceled signal e. Voice energy determination for signal e is based on subtracting an estimated background noise component from signal e, leaving a remaining energy component that is ideally representative of desired-voice energy. This remaining voice energy is compared to the energy contained in the estimated-echo signal y, after multiplying signal y by a constant. The constant is chosen such that the LEC needs to achieve substantial echo cancellation—12 dB represents an exemplary value for required echo loss—for the NLP mode controller not to falsely trigger on echo-only voice. Such prior-art echo suppressers typically include a delay time used when transitioning the NLP from desired-voice mode to echo-only voice mode such that the trailing end of desired speech is not inadvertently clipped or disrupted. This measure is helpful because trailing end desired-voice is often low in amplitude and difficult detect.

Because effective echo cancellation in the echo-cancelled signal e requires accurate point-by-point matching between the estimated-echo signal y and the actual echo component in the echo-containing signal u, the prior-art approach of basing desired voice detection on measuring the energy of signal e is problematic. Essentially, these problems arise from the fact that, while the overall energy of the estimated echo-signal y is generally an accurate estimate of the overall energy of the echo component in the echo-containing signal u, step changes in echo-path characteristics—network or acoustic—can result in the LEC 144 outputting a momentarily poor estimate of actual echo, which results in individual inaccuracies or time misalignments between the point-by-point estimated echo values comprising signal y and the actual echo component in signal u. Thus, the improved hybrid echo suppresser 140 of the present invention realizes performance advantages in basing desired voice detection on the relatively good energy estimate of signal y, rather than relying on the point-to-point matching of signal y with actual echo in signal u, as is implicit in prior-art hybrid echo suppressers that base NLP control on processing signal e.

When the point-by-point accuracy of the estimated-echo signal y is compromised, subtracting the estimate-echo signal y from the echo-containing signal u does not result in effective echo cancellation in the echo-cancelled signal e. Therefore, apparent desired-voice energy in the echo-canceled signal e increases, causing the aforementioned undesirable tendency of prior-art hybrid echo suppressers to erroneously detect desired-voice. Upon falsely detecting desired voice, these prior-art echo suppressers may inadvertently switch to desired-voice mode, thereby subjecting the far-end telephone handset user to unpleasant echo. Thus, changes in the echo-cancelled signal e, such as a sudden increase in energy, may arise from the start of desired voice or from a poorly matched estimated-echo signal y. Prior-art echo suppresser mode control does not adequately address the problem of erroneously detecting the presence of desired voice based on detecting a rise of signal energy in the echo-cancelled signal e caused by poor LEC operation.

As noted above, the present invention concerns, in part, how to reliably detect the start of desired-voice, such that control logic 142 properly switches NLP 146 from its echo-voice mode to its desired-voice mode. Unless this is done quickly and dependably, the desired voice speech is subject to clipping, interruption, or distortion due to control logic 142 inadvertently operating NLP 146 in its echo-voice mode. Moreover, the present invention is concerned with reliable continued detection of desired voice such that control logic 142 does not inadvertently switch NLP 146 from desired-voice mode to back to echo-voice mode. Hybrid echo suppresser 140 reliably maintains desired-voice mode, even in the presence of double-talk, thereby avoiding inadvertent switching of the NLP from desired-voice to echo-voice mode.

Hybrid echo suppresser 140 advantageously bases mode control of NLP 146 on comparing characteristics of the echo-containing signal u with corresponding characteristics of the estimated-echo signal y. In contrast, exemplary prior-art echo suppressers that include both LEC and NLP components base NLP mode control on characteristics of the echo-canceled signal e and the estimated-echo signal y. In an exemplary embodiment of hybrid echo suppresser 140, control logic 142 performs this comparison.

By basing desired-voice detection on an energy comparison between echo-containing signal u and estimated-echo signal y, the present invention's NLP mode control is relatively insensitive to the echo-cancellation effectiveness of LEC 144. Thus, NLP mode control is not as prone as prior-art systems to NLP-mode control errors caused by echo-path changes. Eliminating NLP mode control problems caused by echo-path dependence is extremely important in mobile communications applications such as hands-free mobile communications systems typically installed in motor vehicles. In such installations, the mobile terminal 100 is replaced or supplemented by additional microphone inputs and loudspeaker outputs allowing a user to engage in hands-free conversation with a far-end party. Such environments commonly have dramatic changes in acoustic echo path, such as in the changing position of a driver's legs positioned between a door-mounted loudspeaker and a centrally mounted microphone.

A description of mobile terminal operation in the context of Time Division Multiple Access techniques (TDMA) is helpful in order to better understand the operation of hybrid echo suppresser 140. Mobile communications systems that employ TDMA techniques use periodic frames of time divided into a number of individual time slots. By assigning multiple mobile terminal users to unique time slots within each frame, the mobile communications systems increase the number of simultaneous users supported. Each TDMA frame represents a defined interval of time and the mobile terminal 100 synchronizes its transmitting and receiving operations to corresponding transmit and receive frame timing. TIA/EIA-136 represents an exemplary wireless mobile communications standard employing TDMA techniques. In this standard, each frame represents 20 milliseconds in time. Further, the standard defines an 8 kHz sampling rate which results in 160 digitized samples per frame. However, because the present invention may be practiced in a variety of mobile communications systems, the following discussion will not refer to specific numbers with respect to sample array size.

Figure 3:
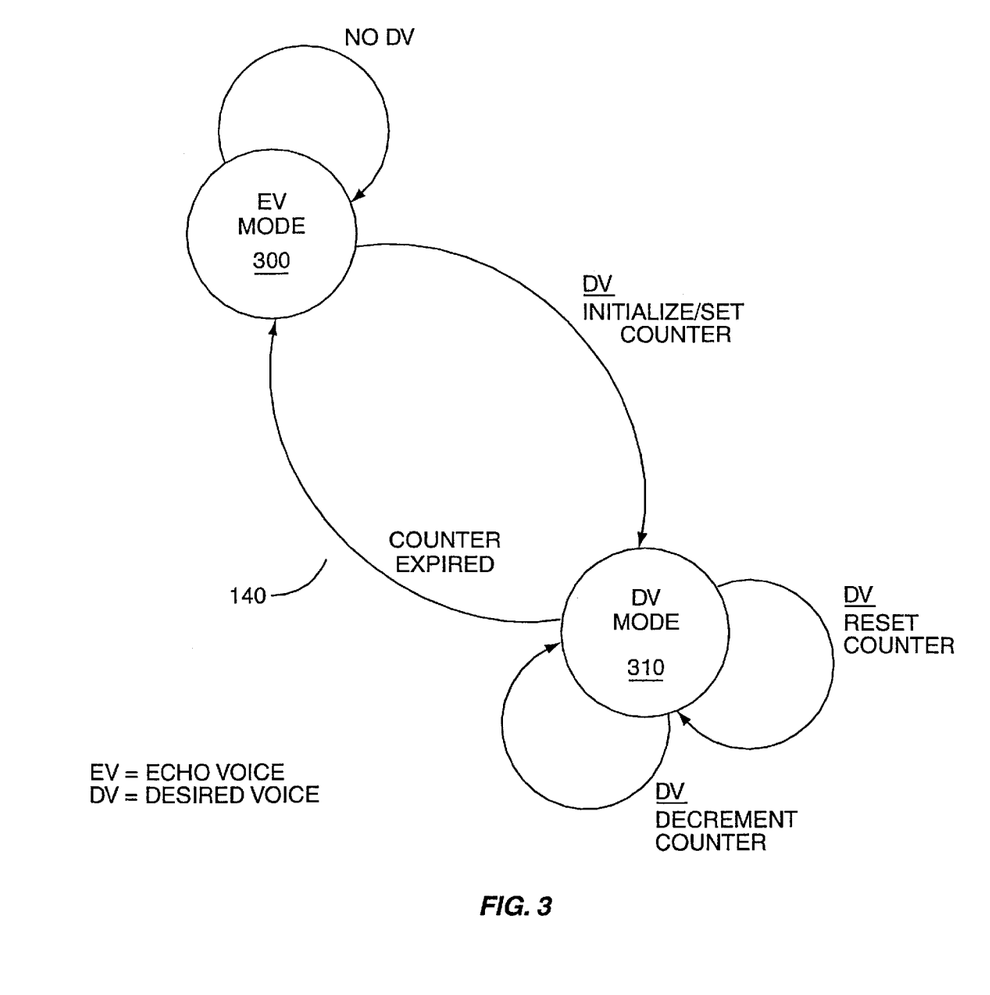
FIG. 3 provides a state diagram for hybrid echo suppresser operation in an exemplary embodiment of the present invention.

FIG. 3 provides a simplified state diagram of hybrid echo suppresser operation in an exemplary embodiment of the present invention, with more detailed logic flow illustrated later in FIG. 4. State transition decision logic executes once per frame. Assume the NLP 146 of hybrid echo suppresser 140 is operating in an echo-voice mode (state 300). Upon detecting a desired-voice component in signal u, control logic 142 changes the operating mode of NLP 146 from blocking (echo-voice mode-state 300) to pass-through (desired-voice mode-state 310), and initializes a frame counter variable. This frame counter variable functions as a timer and defines a minimum duration of time that the NLP 146 will operate in desired-voice mode (state 310). Once per frame, the control logic 142 determines if desired-voice has a continued presence in the echo-containing signal u and, if so, resets the frame counter, thus remaining in desired-voice mode (state 310). Once control logic 142 no longer detects desired-voice in signal u, it begins decrementing the frame counter by one in each subsequent frame in which desired voice is not detected. Upon the frame counter reaching a value of zero, control logic 142 transitions NLP 146 to echo-voice mode (state 300). Thus, the frame counter variable prevents switching back to echo-voice mode too early, as during the hard-to-detect trailing end of desired-voice speech. A typical value for delaying the transition back to echo-voice mode is on the order of 200 ms.

Figure 4:
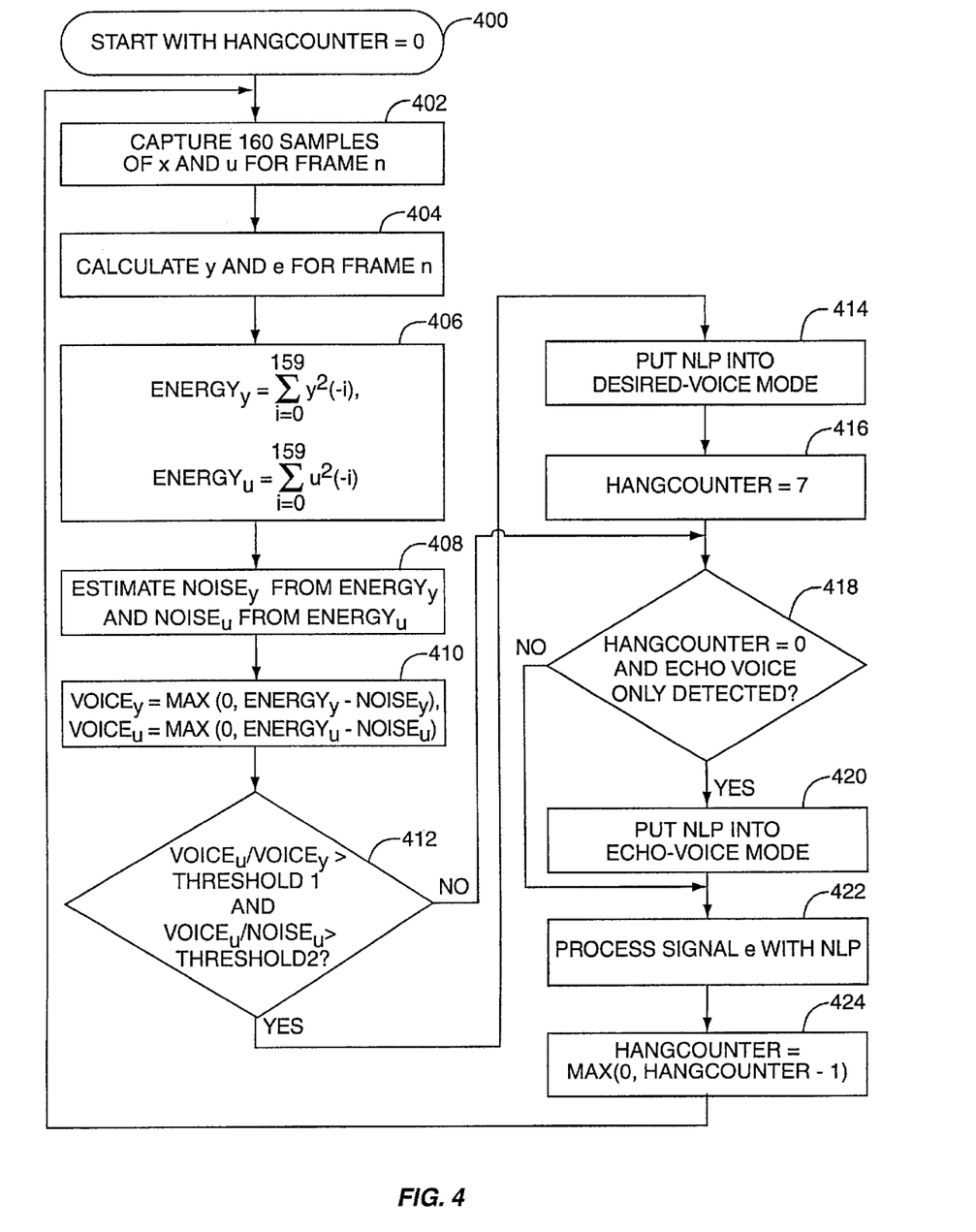
FIG. 4 provides a more detailed logical flow diagram for the operation illustrated in FIG. 3.

FIG. 4 provides detailed operating logic for the general operation illustrated in FIG. 3. In this exemplary embodiment, the processing loop encompassing block 400 to block 424 executes once per TDMA "frame."

Initial processing begins with the frame counter variable "hang-Counter" being initialized to 0 (block 400). Thereafter, the logic detailed in blocks 402–424 repeat once per each subsequent TDMA frame. For each frame n, hybrid echo suppresser 140 uses an echo-causing signal sample array (signal x) and uses an echo-containing signal sample array (signal u)—block 402. LEC 144 uses signal x to compute the estimated-echo signal y, which is then subtracted from signal u to form the echo-canceled signal e (block 404). In this exemplary embodiment, hybrid echo suppresser 140 then computes the energy contained in signals y ($Energy_y$) and u ($Energy_u$). Energy calculations (block 406) are preferably based on a sum-of-squares algorithm, but many other energy-determination algorithms are known and may be used.

Hybrid echo suppresser 140 then estimates noise components $Noise_u$ and $Noise_y$, respectively, for energy signals $Energy_u$ and $Energy_y$ (block 408). Then, hybrid echo suppresser 140 estimates voice energy components $Voice_u$ and $Voice_y$, respectively, for $Energy_u$ and $Energy_y$ using these noise energy estimates (block 410). Having thus obtained measurements of desired-voice energy and echo-voice energy, hybrid echo suppresser 140 determines a first ratio based on $Voice_u$ and the $Voice_y$ ($Voice_u/Voice_y$).

This first ratio is compared to a first, defined threshold (block 412). Hybrid echo suppresser 140 additionally determines a second ratio of $Voice_u$ to $Noise_u$ and compares this value to a second, defined threshold (block 412). If these first and second ratios exceed, respectively, the first and second thresholds, control logic 142 of hybrid echo suppresser 140 switches NLP 146 from an echo-voice mode into a desired-voice mode (block 414) and sets hangCounter to a non-zero value (block 416). Thus, as noted earlier, hybrid echo suppresser 140 transitions NLP 146 from echo-voice mode to desired-voice mode independent of signal energy fluctuations in signal e arising from poor echo cancellation operation of LEC 144. In some embodiments, mode control processing occurs in the current frame, with any mode changes made to the next succeeding frame or frames.

Assuming that desired-voice was detected in block 412, the processing of block 418 returns a "NO" condition as the condition "echo voice only" is untrue. Thus, NLP 146 processes the echo-containing signal e while operating in its desired-voice mode (block 422). The hangCounter variable is decremented by one (block 424) and processing repeats anew with the next frame (block 402).

In any frame where no desired voice is detected ("NO" from block 412), processing continues with an evaluation of the hangCounter (block 418). If the hangCounter variable has decremented to zero—indicating a sustained block of previous frames containing no desired voice—and only echo-voice is detected in the current frame (block 418), control logic 142 switches NLP 146 from desired-voice mode to echo-voice mode (block 420). Thus, NLP 146 processes the echo-containing signal e while operating in its echo-voice mode (block 422). Optionally, if the analysis of block 418 indicates that while hangCounter has reached zero, but no echo-voice is detected, the NLP 146 may stay in its current mode. From there, processing continues with decrementing the hangCounter variable (block 424) and returns to the start of frame processing logic (block 402) for in anticipation of the next frame. Note that decrementing logic prevents underflow of hangCounter (block 424).

In the illustration of FIG. 4, block 412 represents decision logic used to determine the presence of desired-voice within signal u. As this determination is based on comparing computed values against predefined thresholds, explanation of these reference thresholds aids understanding overall desired-voice detection. As noted, prior-art echo suppressers detect desired-voice based on analysis of the echo-cancelled signal e, leaving them vulnerable to sudden changes in signal e arising not from the start of desired-voice, but rather from a change in echo path. While hybrid echo suppresser 140 of the present invention is much less vulnerable to incorrectly controlling NLP 146 because of a poor quality echo estimate (signal y) from LEC 144 than such prior-art systems, desired-voice detection preferably includes certain detection margins to help ensure reliable operation.

Thus, the first threshold represents an appropriate value for the ratio of total voice energy to echo-voice energy ($Voice_u/Voice_y$) in the echo-containing signal. In an exemplary embodiment, the first threshold is set to a value of four, meaning total voice energy $Voice_u$ must be at least four times echo-voice energy $Voice_y$. This requirement helps ensure that the greater voice energy detected in signal u arises not from echo-voice in the echo-containing signal that is not accurately reflected in signal y, but rather from the actual presence of desired voice in signal u. Although this exemplary embodiment computes a ratio of total voice energy to echo-voice energy, a wide variety of mathematical approaches are available. For example, total voice energy may be compared with echo-voice energy multiplied by an appropriate constant. All such approaches to comparing the magnitude of total voice energy with echo-voice energy in the echo-containing signal are within the scope of the present invention.

The second threshold represents a ratio of total voice energy to background noise energy ($Voice_u/Noise_u$). This second threshold may be viewed as a confidence indicator related to the probability that the first ratio exceeds the first threshold because of actual desired-voice. In other words, because $Noise_u$ is an estimated signal subject to certain estimation error, subtracting $Noise_u$ from $Energy_u$ to derive $Voice_u$ may be problematic. This is particularly true unless the total voice component Voice, is substantially larger than the estimated background noise component $Noise_u$. In an exemplary embodiment of the present invention, the second threshold has a value of eight, thus requiring the desired-voice component to have an energy value eight times that of the estimated noise component. Again, comparing total voice energy to noise energy in the echo-containing signal u admits tremendous flexibility in terms of computational approach. It should be noted that "desired-voice," "echo-voice," and "total voice" are not limited to voice only, but may also comprise music or the like intentionally input to the microphone 172; however, because voice is most common, the terms "desired-voice," "echo-voice," and "total voice" are used herein for simplicity. This exemplary embodiment's use of a ratio calculation should not be construed as limiting.

Figure 5:
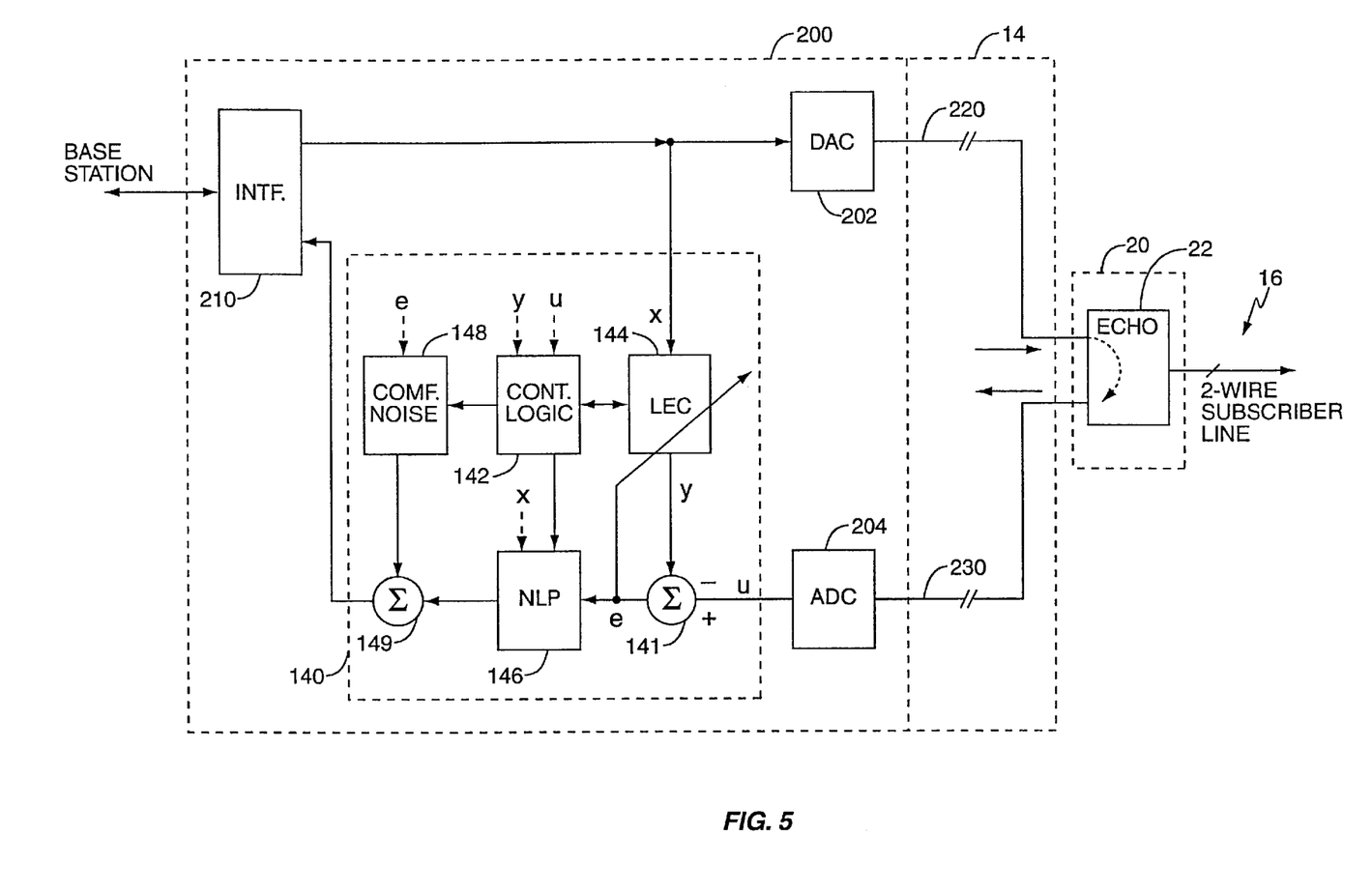
FIG. 5 is a block diagram for an alternate, exemplary embodiment of the hybrid echo suppresser of the present invention, as used in a mobile switching center.

Acoustic echo, as earlier noted, represents one of two primary causes of voice echo in the communications system 10. The hybrid echo suppresser may, in other embodiments, also serve to suppress the second primary cause of voice echo, namely, network echo. For this function, the mobile terminal 100, a base station, the MSC 200, or the PSTN may include the hybrid echo suppresser 140 of the present invention. FIG. 5 provides an exemplary illustration of an embodiment where the MSC 200 includes the hybrid echo suppresser 140.

The MSC 200 includes an interface 210 for transferring signals to and from base station 24. Signals representative of the mobile terminal user's speech are transmitted by the MSC 200 through the PSTN transmission network 14 to the Central Office 20 on a transmit wire pair 220—these signals are termed the transmitted speech signal. Likewise, signal representative of the telephone handset user's speech are received by the MSC 200 from Central Office 20 through PSTN 14 on a receive wire pair 230—these signals are termed received speech signals. While the wire pairs 220, 230 are shown as wire pairs in FIG. 1, the wire pairs need not be actual physical wire pairs; for instance, the wire pairs 220,230 may be digital trunk lines with separate transmit and receive paths. The Central Office 20 uses hybrid 22 to combine transmitted and received speech signals from transmit and receive wire pairs 220 and 230, for transfer on the two-wire subscriber loop 16.

Due to impedance mismatches between the hybrid circuit 22 and subscriber loop 16, a portion of the transmitted signals carried on wire pair 220 couple into the received signals carried by wire pair 230. Absent adequate network echo control, the mobile terminal user hears a delayed version of their own speech signal output from the loudspeaker 168 of mobile terminal 100.

In the context of FIG. 5, the outgoing transmitted speech signals from mobile terminal 100 are considered the echo-causing signal x, while the incoming received speech signals from the telephone handset 18 are considered the echo-containing signal u. Note that, in an exemplary embodiment, the hybrid echo suppresser 140 of the present invention operates on signal x before conversion to analog format by DAC 202 and operates on signal u after conversion to digital format by ADC 204. With these references established, operation of the present invention in the context of network echo suppression may be readily understood on the basis of the discussion related to FIGS. 2A–4.

Further note that the hybrid echo suppresser of FIG. 5 includes an additional element, a comfort noise generator 148 and a summing circuit 149 for combining the echo-cancelled/suppressed signal output from NLP 146 with the output of comfort noise generator 148. The co-pending application, Ser. No. 09/005,145, entitled "Methods and Apparatus for Providing Comfort Noise in Communications Systems," filed on Jan. 9, 1998, includes details on comfort noise generation, the disclosure of which is incorporated herein by reference.

Optionally, the suppression of network echo may be carried out in the mobile terminal 100, substantially as described in relation to acoustic echo.

The present invention may, of course, be carried out in other specific ways than those herein set forth without departing from the spirit and essential characteristics of the invention. Other embodiments of the present invention extend beyond exemplary embodiments in a mobile terminal 100 or MSC 200. Indeed, speakerphones, intercom systems, and other types of two-way communications systems benefit from the hybrid echo suppresser of the present invention. Note that in the context of this disclosure, the term "two-way" is not limiting in the sense that the "echo-containing" and "echo-causing" signals discussed herein may actually contain voice and echo components from multiple sources. Thus, multi-party calling arrangements and other systems providing simultaneous multi-caller connections fall directly within the scope of the present invention, as will be readily appreciated by those skilled in the art in light of the detailed specification and supporting drawings.

Additionally, note that the hybrid echo suppresser 140 of the present invention may be advantageously used to cancel echo in certain non-voice data signals and, thus, its use is not limited to echo cancellation for systems carrying voice conversation. All such echo cancellation applications, including voice and non-voice echo cancellation use are within the scope and spirit of the present invention.

Note also that operating the NLP 146 of the present invention in a desired-voice mode or echo-voice mode, as disclosed herein, should not be construed as a limitation of the present invention. Multiple NLP operating modes may be defined, with varying levels or characteristics of echo-cancelled signal attenuation. Operating the NLP 146 with one or more characteristics that prevent undesirable clipping or suppression of the desired voice signal represents an important aspect of the present invention. Specific levels of attenuation are not critical and may be implemented in accordance with the needs of a given application.

Further, the present invention admits tremendous flexibility regarding desired-voice detection processing of the echo-containing signal u and estimated-echo signal y. While exemplary embodiments of the present invention based desired-voice detection on energy comparisons between these two signals, many other techniques for comparing these signals may be used, as will be appreciated by those skilled in the art. Moreover, energy determination admits flexibility and may be based on sum-of-squares, peak detection, sum-of-magnitudes, or other processing techniques. Also, the various operations required for the hybrid echo suppresser of the present invention may be realized in hardware, software, or any combination of both. Further, the hybrid echo suppresser's functionality may be split among multiple devices or integrated into a single DSP as disclosed.

Additionally, the first and second thresholds disclosed herein for use in desired-voice detection calculations may be adjusted in value, changed, or otherwise modified, without departing from the spirit of the present invention. Indeed, the hybrid echo suppresser of the present invention advantageously processes the echo-containing signal u and estimated-echo signal y to determine start (or continuation) of desired voice, thereby minimizing vulnerability to momentarily poor echo estimates. The present embodiments are, therefore, to be considered in all respects as illustrative and not restrictive, and all changes coming within the meaning and equivalency range of the appended claims are intended to be embraced therein.

What is claimed is:

1. A method of controlling echo in a communications device, said method comprising:

estimating an echo component in an echo-containing signal to produce an estimated-echo signal by processing an echo-causing signal associated with said echo component;

canceling a portion of said echo component from said echo-containing signal to produce an echo-cancelled signal based on combining said estimated-echo signal with said echo-containing signal;

producing an echo-suppressed signal based on said echo-cancelled signal by attenuating said echo-cancelled signal with a first level of attenuation when operating in a first mode and with a second level of attenuation when operating in a second mode, said second level of attenuation having lesser attenuation than said first level of attenuation; and determining when to change from said first mode to said second mode based on comparing said echo-containing signal with said estimated-echo signal.

2. The method of claim 1 wherein determining when to change from said first mode to said second mode based on comparing said echo-containing signal with said estimated-echo signal comprises comparing an energy value for said echo-containing signal with an energy value for said estimated-echo signal.

3. The method of claim 2 further comprising subtracting a background noise energy estimate from said energy value for said echo-containing signal before said comparing with said energy value for said estimated-echo signal.

4. The method of claim 2 further comprising subtracting a background noise energy estimate from said energy value for said estimated-echo signal before said comparing with said energy value for said echo-containing signal.

5. The method of claim 1 wherein determining when to change from said first mode to said second mode based on comparing said echo-containing signal with said estimated-echo signal comprises:
  estimating a first noise energy associated with said echo-containing signal;
  calculating a total-voice energy for said echo-containing signal based on said first noise energy estimate;
  estimating a second noise energy associated with said estimated-echo signal;
  calculating an echo-voice energy for said estimated-echo signal based on said second noise energy estimate;
  calculating a first ratio based on said total-voice energy and said echo-voice energy;
  determining when to change from said first mode to said second mode based on whether said first ratio exceeds a first threshold.

6. The method of claim 5 wherein determining when to change from said first mode to said second mode based on comparing said echo-containing signal with said estimated-echo signal further comprises:
  calculating a second ratio based on said total-voice energy and said first estimated noise energy;
  determining when to change from said first mode to said second mode further based whether said second ratio exceeds a second threshold.

7. The method of claim 6 further comprising remaining in said second mode while said first and second ratios exceed, respectively, said first and second thresholds.

8. The method of claim 7 further comprising changing from said second mode to said first mode a defined interval of time after either said first ratio or said second ratio fails to exceed, respectively, said first and second thresholds.

9. The method of claim 1 wherein estimating an echo component in said echo-containing signal to produce an estimated-echo signal by processing said echo-causing signal associated with said echo component comprises processing said echo-causing signal with a linear echo canceller.

10. The method of claim 1 wherein said attenuating said echo-cancelled signal with a first level of attenuation when operating in a first mode and with a second level of attenuation when operating in a second mode comprises processing said echo-containing signal with a non-linear processor that substantially blocks said echo-cancelled signal when operating in said first mode and substantially passes said echo-cancelled signal when operating in said second mode.

11. The method of claim 1 wherein said communications device is a mobile switching center providing signal transfers between one or more mobile terminals and an external communications network and said controlling of echo minimizes a network induced echo-voice signal returned to a mobile terminal user.

12. The method of claim 1 wherein said communications device is a wireless communications mobile terminal for communicating with a remote party and said controlling of echo minimizes a network induced echo-voice signal at said mobile terminal.

13. The method of claim 1 wherein said communications device is a wireless communications mobile terminal for communicating with a remote party and said controlling of echo minimizes an echo-voice signal returned to said remote party through acoustic coupling by said mobile terminal.

14. The method of claim 13 wherein said mobile terminal is adapted to operate in a frame-based mobile communications system and further wherein said steps of estimating, canceling, suppressing, and determining are performed on a per-frame basis.

15. The method of claim 14 wherein said frame-based mobile communications system operates compatible with a standard selected from the group comprising AMPS, GSM, IS-95, and EIA/TIA-136.

16. The method of claim I wherein said communications device is a hands-free system for communicating with a remote party and said controlling of echo minimizes an echo-voice signal returned to said remote party through acoustic coupling by said hands-free communications system.

17. The method of claim 1 further comprising using a digital signal processor to perform said steps of estimating said echo component, canceling a portion of said echo component, producing said echo-suppressed signal, and determining when to change from said first mode to said second mode.

18. The method of claim 17 wherein said digital signal processor performs said step of estimating said echo component by operating as a linear echo canceller.

19. The method of claim 17 wherein said digital signal processor performs said step of producing said echo-suppressed signal by operating as a non-linear processor.

20. An echo suppression device comprising:
  an echo estimator generating an estimated-echo signal based on an echo-causing signal;
  a combiner combining said estimated-echo signal with an echo-containing signal to form an echo-cancelled signal, said echo-containing signal having an echo component associated with said echo-causing signal;
  a suppresser processing said echo-cancelled signal with a first attenuation level when operating in a first mode and processes said echo-cancelled signal with a second attenuation level when operating in a second mode, said second attenuation level having less attenuation than said first attenuation level; and
  a controller switching said suppresser from said first mode to said second mode based on comparing said echo-containing signal to said estimated-echo signal.

21. The echo suppression device of claim 20 wherein said controller is adapted to determine:
  a first energy value based on said echo-containing signal;
  a first noise energy estimate based on said echo-containing signal;
  a desired-voice energy value based on said first energy value and first noise energy estimate;
  a second energy value based on said estimated-echo signal;
  a second noise energy estimate based on said estimated-echo signal;
  an echo-voice energy value based on said second energy value and second noise energy estimate; and
  a first ratio based on said desired-voice energy value and said echo-voice energy value;
  said controller further adapted to switch said suppresser from said first mode to said second mode based on comparing said first ratio to a first threshold.

22. The echo suppression device of claim 21 wherein said controller is further adapted to switch from said first mode to said second mode based on further comparing a second ratio based on said desired-voice energy value and said first noise energy estimate to a second threshold.

23. The echo suppression device of claim 20 wherein said first level of attenuation substantially blocks said echo-cancelled signal and said second level of attenuation substantially passes said echo-cancelled signal.

24. The echo suppression device of claim 20 wherein said echo estimator is a linear echo canceller.

25. The echo suppression device of claim 20 wherein said suppresser is a non-linear processor.

26. The echo suppression device of claim 20 wherein said echo estimator, said combiner, said suppresser, and said controller form a portion of a digital signal processor and are based on said digital signal processor executing stored program instructions.

27. A wireless communications mobile terminal comprising:
- a receiver receiving a remote audio signal;
- an audio output device producing sound based on said remote audio signal;
- an audio input device receiving a local audio signal, said local audio signal undesirably including an echo portion of said sound produced based on said remote audio signal;
- a transmitter transmitting an echo-suppressed signal; and
- an echo suppresser for producing said echo-suppressed signal based on an echo-cancelled signal;
- said echo suppresser comprising:
    - an estimator producing an estimated-echo signal based on said remote audio signal;
    - a combiner combining said estimated-echo signal with said local audio signal to produce said echo-cancelled signal;
    - a suppresser attenuating said echo-cancelled signal to produce said echo-suppressed signal, said suppresser attenuating said echo-cancelled signal at a first level when operating in a first mode and at a second level when operating in a second mode, said second level having less attenuation than said first level; and
    - a controller switching said suppresser from said first mode to said second mode based on comparing said echo-containing signal to said estimated-echo signal.

28. The mobile terminal of claim 27 wherein said controller is adapted to determine:
- a first energy value based on said local audio signal;
- a first noise energy estimate based on said local audio signal;
- a desired-voice energy value based on said first energy value and first noise energy estimate;
- a second energy value based on said estimated-echo signal;
- a second noise energy estimate based on said estimated-echo signal;
- an echo-voice energy value based on said second energy value and second noise energy estimate; and
- a first ratio based on said desired-voice energy value and said echo-voice energy value;
- said controller further adapted to switch said suppresser from said first mode to said second mode based on comparing said first ratio to a first threshold.

29. The mobile terminal of claim 28 wherein said controller is further adapted to switch from said first mode to said second mode based on further comparing a second ratio based on said desired-voice energy value and said first noise energy estimate to a second threshold.

30. The mobile terminal of claim 27 wherein said first level of attenuation substantially blocks said echo-cancelled signal and said second level of attenuation substantially passes said echo-cancelled signal.

31. The mobile terminal of claim 27 wherein said estimator is a linear echo canceller and wherein said suppresser is a non-linear processor.

32. The mobile terminal of claim 27 wherein said echo suppresser forms a portion of a digital signal processor and is based on said digital signal processor executing stored program instructions.

* * * * *